United States Patent [19]

Owen

[11] 3,864,520

[45] Feb. 4, 1975

[54] SIGNAL MONITORING CONTROL APPARATUS

[75] Inventor: James Owen, Milwaukie, Oreg.

[73] Assignee: Ford Industries, Inc., Portland, Oreg.

[22] Filed: Mar. 6, 1974

[21] Appl. No.: 448,560

Related U.S. Application Data

[63] Continuation of Ser. No. 274,856, July 25, 1972, abandoned.

[52] U.S. Cl. ....... 179/1 VC, 179/100.1 VC, 179/6 R

[51] Int. Cl. ........................................... H04m 1/64

[58] Field of Search ....... 179/1 VC, 2 DP, 6, 15 AS, 179/100.1 VC

[56] References Cited

UNITED STATES PATENTS

| | | | |
|---|---|---|---|
| 2,946,852 | 7/1960 | Brown et al. | 179/1 VC |
| 3,448,215 | 6/1969 | Engel | 179/1 |
| 3,688,043 | 8/1972 | Konno | 179/6 R |
| 3,711,649 | 1/1973 | Ando | 179/6 R |
| 3,712,959 | 1/1973 | Fariello | 179/1 VC |

*Primary Examiner*—William C. Cooper
*Assistant Examiner*—E. Matt Kemeny
*Attorney, Agent, or Firm*—Kolisch, Hartwell, Dickinson & Stuart

[57] ABSTRACT

A circuit for detecting the presence and continuity of talking signals in a telephone line and the like. The circuit determines, as being talking, any signal containing successive time gaps which are longer than syllabic minimum-length time gaps encountered in normal speech, but which are shorter than a selected longer time interval which exceeds any time gap that would usually be expected in normal speech. Time gaps are measured by two resettable digital timers, one of which holds the other reset if talking is present on the line.

6 Claims, 2 Drawing Figures

SIGNAL MONITORING CONTROL APPARATUS

CROSS-REFERENCE TO RELATED APPLICATION

This application is a continuation of my prior-filed copending application entitled "Signal Monitoring Control Apparatus," Ser. No. 274,856, filed July 25, 1972, now abandoned.

BACKGROUND AND SUMMARY OF THE INVENTION

This invention pertains to apparatus for determining the presence or absence of a normal speech signal in a telephone line. For the purpose of illustration, a preferred embodiment of the invention is disclosed herein as being incorporated in a conventional telephone answering device, with which the invention has been found to have particular utility.

The usual telephone answering device functions to answer an incoming call on a telephone line—normally for the purpose of playing out to the calling party some prerecorded message, and for then allowing this party to record a message of his own. With such a device, it is important that after the completion of a calling party's message, or in the event that no such message is delivered, a talking connection with the telephone line be broken to assure readiness in the device properly to handle the next incoming call. The device, in other words, should be equipped to detect the presence and continuity of a normal speech signal in a line, and to distinguish such a signal from other conditions (i.e., silence, "off-hook" tones, etc.) which may occasionally exist in the line.

A general object of the present invention, therefore, is to provide a novel signal-monitoring control circuit, or apparatus, for reliably detecting the presence and continuity of normal speech in a telephone line or the like.

Another object is to provide such a circuit which makes the determination mentioned by looking for the presence in a signal of certain time gaps which are characteristic of normal speech.

Still a further object of the invention is to provide a circuit of the type generally indicated which produces an indicative output signal on determining that normal speech signals are not present in a line.

Experience has shown that in normal speech, many time gaps exceed about 100 milliseconds. Observations have further shown that normal speech gaps rarely exceed about 12 seconds. Normal speech indeed contains gaps falling within these two limits.

Thus, a more specific object of the invention is to provide a control circuit of the type outlined above which determines, as being an acceptable speech signal in a line, any signal characterized by having gaps whose durations fall within the just-mentioned limits. A convenient lower time limit which has been selected for use in the apparatus disclosed herein is 166.5 milliseconds.

In general terms, the invention comprises three principal components: an input circuit which is adapted to be coupled to a telephone line or the like for the purpose of receiving signals carried therein; a criterion-determining circuit connected to this input circuit and constructed to determine, as being an "acceptable" signal, any signal received by the input circuit which contains successive time gaps between the selected limits mentioned above; and an output circuit connected to the criterion-determining circuit which produces an output control signal (that may be used for breaking a talking connection) in the absence of receipt by the input circuit of an acceptable signal.

An important feature of the invention which contributes significantly to its reliability is that the criterion-determining circuit is formed of digital-type circuitry, including clock pulse generators and digital counters. With the use of such circuitry, precise timing is attainable, and a very accurate determination can be made with respect to the presence, continuity and absence of a voice signal in a line.

DESCRIPTION OF THE DRAWINGS

These and other objects and advantages attained by the invention will become more fully apparent as the description which follows is read in conjunction with the accompanying drawings, wherein.

and

Figure 1:
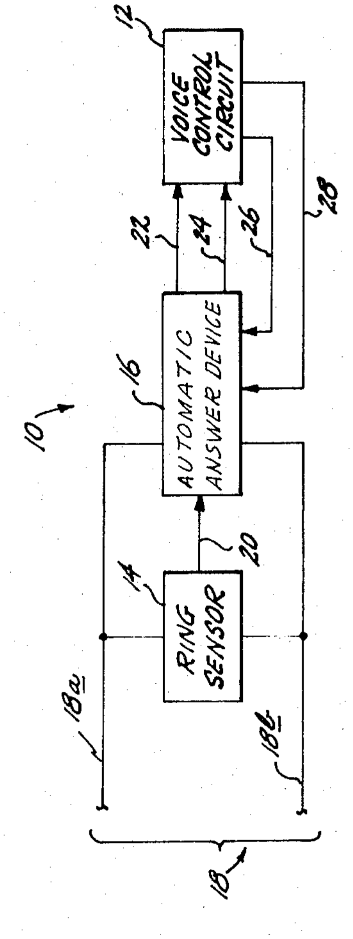
FIG. 1 is a block diagram illustrating a telephone answering system employing control apparatus as contemplated herein.
Figure 2:
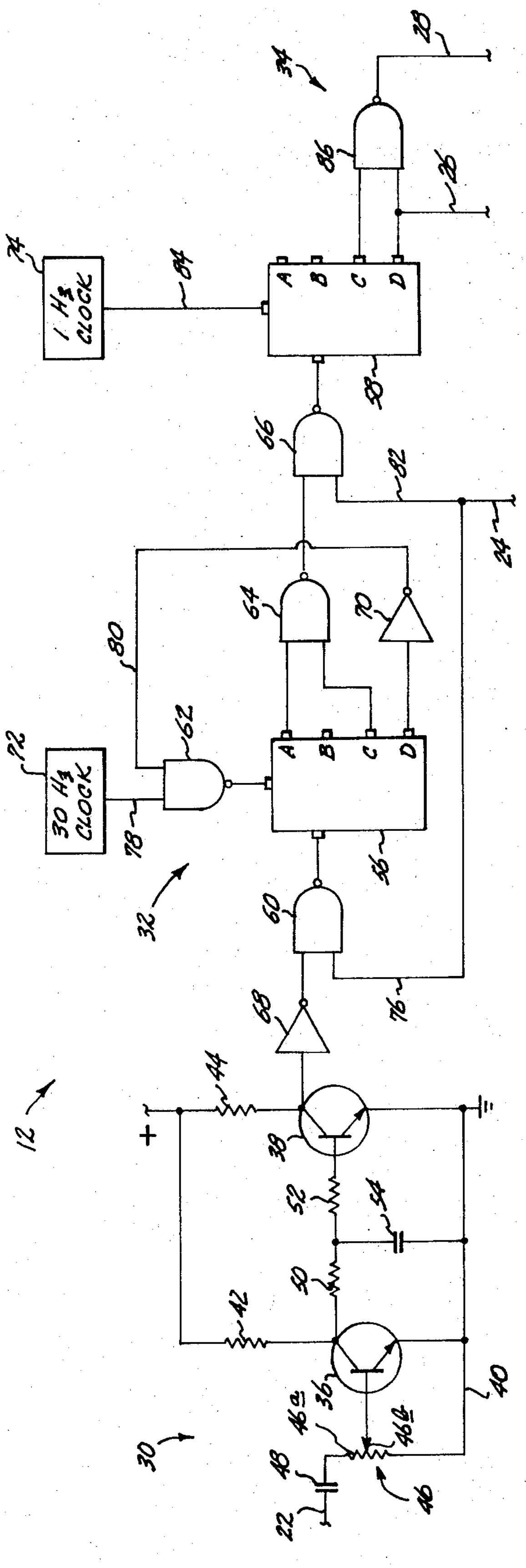

FIG. 2 is a circuit diagram illustrating details of the control apparatus of FIG. 1.

DETAILED DESCRIPTION OF THE INVENTION

1. Explanation of Terminology

Explaining briefly certain terminology which will be used in the description which follows, various components shown in the drawings operate in response to a pair of voltage levels. More specifically, one of these levels corresponds to a certain positive voltage (typically about +3 volts) which will be referred to hereinafter as a "1" state. The other level corresponds to ground, and will be called hereinafter a "0" state. A terminal, or a conductor, having one of these voltage levels on it will be referred to as being in, or as having on it, either a "1" or a "0" state.

2. The System of FIG. 1 Generally

Turning now to the drawings, and referring particularly to FIG. 1, indicated generally at 10 is a telephone answering system of the type which may be used at the location of a subscriber's telephone to receive incoming calls when the subscriber is absent. System 10 includes a voice control circuit, or signal-monitoring control apparatus, 12 constructed according to the invention, a conventional ring sensor 14, and additional conventional telephone answering apparatus represented by a block 16. The apparatus represented by block 16 includes, for example, message recording and playback means, and associated circuitry, none of which forms any part of the present invention. System 10, as shown in FIG. 1, is connected to receive incoming calls on a telephone line 18 which includes the usual pair of conductors 18*a*, 18*b*. Ring sensor 14 and block 16 are connected directly between conductors 18*a*, 18*b*. In addition, the ring sensor and block 16 are interconnected through a conductor 20. Four conductors, indicated at 22, 24, 26, 28, interconnect circuit 12 and apparatus in block 16. As will be more fully explained, conductors 22, 24 are for supplying information from apparatus in block 16 to circuit 12, and conductors 26, 28 are for supplying information in the reverse direction.

Explaining briefly the operation of system 10, in very general terms, when ringing occurs in line 18, ring sensor 14 responds and supplies a suitable signal via conductor 20 to apparatus in block 16. The apparatus in this block then establishes a talking connection with line 18, whereupon a prerecorded message, left by the subscriber, is played out over the line to the calling party. Such a message will be referred to hereinafter as an announcement. At the end of the announcement, the talking connection established with line 18 is maintained to allow the calling party, if he so desires, to record a message which may later be heard by the subscriber.

Voice control circuit 12 plays an important part from this point on in the operation of system 10. More specifically, at the end of the announcement, a signal indicating that such has occurred is supplied circuit 12 over conductor 24. At essentially the same time, an operative connection is established via conductor 22, and through apparatus in block 16, with line 18, whereupon control circuit 12 can monitor signals in the telephone line. With these steps accomplished, control circuit 12 then monitors signals in the telephone line to determine whether and when the talking connection (previously established) with the line should be broken. With circuit 12, so long as normal talking signals are present in the line, with these signals having gaps no less than about 166.5 milliseconds and no greater than 12 seconds, the talking connection is maintained. These two time spans are referred to herein as preselected, or certain, time spans. However, if these signal conditions are not met, then, control circuit 12 supplies an output control signal via conductor 28 to apparatus in block 16 which is effective to break the talking connection with line 18.

As will be more fully explained later, in order to assure ample opportunity for maintenance of the talking connection, a signal from circuit 12 to break a talking connection is withheld until about 12 seconds after it first begins to appear that the proper signal conditions do not exist in the telephone line. Prior to the expiration of this 12-second period, and more specifically, at about 8 seconds into the period, circuit 12 transmits via conductor 26 a warning signal which activates a conventional warning tone generator in block 16. The tone produced by this generator is supplied to line 18, and acts as a warning to any calling party that he must resume the conversation if the talking connection is to be maintained. A more detailed discussion of the conditions under which the control circuit will or will not effect breaking of a talking connection will come later in this description.

3. Details of Circuit 12

Turning now to FIG. 2 which illustrates details of control circuit 12, the control circuit includes an input circuit 30, a criterion-determining circuit 32, and an output circuit 34.

Input circuit 30 comprises a pair of transistors 36, 38. The emitters of transistors 36, 38 are connected to a grounded conductor 40, and the collectors of the transistors are connected to a suitable source of positive voltage through resistors 42, 44, respectively. The base of transistor 36 connects with the wiper **46*b* of an adjustable resistor 46. One end of the resistance winding 46*a* of resistor 46 is connected to conductor 40, and the other end of this winding is connected through a coupling capacitor 48 to previously mentioned conductor 22. The collector of transistor 36 is connected to the base of transistor 38 through series-connected resistors 50, 52. The junction between these resistors is connected through a capacitor 54 to conductor 40.**

Circuit 32 includes two four-bit digital pulse counters 56, 58, four two-input NAND gates, or gating means, 60, 62, 64, 66, and two inverters 68, 70. Circuit 32 also includes two clock pulse generators, or means, 72, 74. These components are referred to collectively herein as digital circuit means. Each component is conventional in construction. Counters 56, 58 together are referred to as being portions of a pulse counting means; and counter 56 and generator 72, as well as counter 58 and generator 74 are referred to as timing means.

Explaining briefly how the counters and NAND gates perform, and considering first the counters, with a "0" state existing on the reset terminal of a counter, each negative-going edge of a square wave voltage pulse applied to the counting terminal in the counter results in a change of voltage state on one or more of the output terminals in the counter. With a "1" state applied to the reset terminal, the counter automatically resets to, and remains in, a zero-count condition. Table I which follows indicates the respective voltage states that exist on the different output terminals in each counter for each different given count registrable therein.

TABLE I

| Counted Pulse | States of Output Terminals A | B | C | D |
|---|---|---|---|---|
| 0 (Zero-count condition) | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

Each of the NAND gates functions as follows: with a "0" state on any input of the gate, the output of the gate is held in a "1" state; with both inputs in a "1" state, the output is placed in a "0" state.

When operating, clock 72 supplies square wave voltage pulses (alternating between "0" and "1" states) at a rate of 30 Hertz. Clock 74 supplies similar pulses at a rate of 1 Hertz.

The input of inverter 68 is connected directly to the collector of transistor 38, and the output of this inverter is connected directly to the upper input of gate 60. The lower input of gate 60 is connected through a conductor 76 to previously mentioned conductor 24. The output of gate 60 is connected directly to the reset terminal of counter 56.

Pulses from clock 72 are supplied through a conductor 78 to the left input in FIG. 2 of gate 62. The right input of this gate in the figure is connected through a conductor 80 to the output of inverter 70, whose input is connected directly to the D output terminal of counter 56. The output of gate 62 is connected directly to the counting terminal of counter 56. The A and C output terminals of counter 56 are connected to the upper and lower inputs, respectively, of gate 64. The B output terminal of counter 56 is unconnected to anything external to the counter.

Further describing the connections between components in circuit 32, the output of gate 64 is connected to the upper input of gate 66, and the lower input of the latter is connected through a conductor 82 to conductor 24. The output of gate 66 is connected directly to the reset terminal of counter 58. Pulses from clock 74 are supplied through a conductor 84 to the counting terminal of counter 58. The A and B output terminals of counter 58 are unconnected to anything external to this counter.

Output circuit 34 comprises a two-input NAND gate 86 which is substantially the same in construction as the NAND gates previously mentioned. The upper and lower inputs of this gate are connected to the C and D output terminals, respectively, of counter 58. The lower input of the gate, in addition, is connected to previously mentioned conductor 26. The output of gate 86 is connected to previously mentioned conductor 28.

4. Operation of Circuit 12

Explaining now how circuit 12 performs, let us consider first the initial conditions which exist in the circuit with system 10 awaiting an incoming call on line 18. In this situation, transistor 36 is off and transistor 38, and clocks 72, 74 are on. Circuitry in block 16 applies a "1" state through conductor 24, and through conductors 76, 78, to the lower inputs of gates 60, 66.

With transistor 38 on, its collector, and hence the input of inverter 68, are in "0" states. Consequently, the output of inverter 68 applies a "1" state to the upper input of gate 60. "1" states thus exist on both of the inputs of gate 60, with the result that the output of this gate is in a "0" state which it applies to the reset terminal of counter 56.

Counter 56, while in a condition to respond to pulses at its counting terminal (inasmuch as its reset terminal is in a "0" state), is provided no such pulses at this time for the reason that the counter normally resides in a condition storing a count of EIGHT. The reason for this will be explained later. With a count of EIGHT stored in this counter, its A and C output terminals are in "0" states, and its D output terminal is in a "1" state, with the latter state applied to the input of inverter 70. As a consequence, the output of inverter 70 is in a "0" state which is applied to the right input of gate 62. With this "0" state thus applied, the output of gate 62 is held in a "1" state, regardless of the voltage condition existing at its left input. Pulses produced by clock 72, therefore, are not now admitted by gate 62 to the counting terminal of counter 56.

With "0" states existing at the A and C output terminals of counter 56, the output of gate 64 is in a "1" state which is applied to the upper input of gate 66. Gate 66 thus has "1" states on both of its inputs, and consequently has a "0" state on its output, which state is applied to the reset terminal of counter 58.

Counter 58 is thus normally in a condition counting pulses coming from clock 74. However, with system 10 now in a condition awaiting an incoming call, and because there is no talking connection established with line 18, counting which takes place at this time in counter 58 is of no particular consequence.

When a call comes in over line 18, ring sensor 14 responds to the ringing current in the line which signals the arrival of the call. The ring sensor sends a signal via conductor 20 to activate apparatus in block 16. Such apparatus "answers" the call by establishing a talking connection with the telephone line. Suitable apparatus in block 16 also places a "0" state on conductor 24. Such action results in the outputs of gates 60, 66 switching to "1" states to place and hold counters 56, 58 in zero-count conditions. Apparatus in block 16 then causes a prerecorded announcement (from the subscriber) to be played out over the line. During the transmission of this announcement, conductor 24 is maintained in a "0" state. Nothing of consequence occurs in voice control circuit 12 until the end of this announcement.

When the announcement ends, conductor 24 is returned to a "1" state condition, and an operative connection is established through block 16 between conductor 22 and the telephone line. The particular kinds of apparatus in block 16 for accomplishing these ends may take any of a number of forms well known to those skilled in the art, and thus are not shown herein. After such answering of a call, other apparatus in block 16 starts up a magnetic tape, or the like, for recording any incoming message which the calling party may now wish to leave.

With return of conductor 24 to a "1" state condition, the outputs of gates 60, 66 return to "0" states, which action frees counters 56, 58 to begin counting. Gate 62 is now in a condition to pass pulses from clock 72 to the counting terminal of counter 56. Thus, counter 56 begins counting along with counter 58.

As has been mentioned earlier, circuit 12 is intended to determine whether or not normal speech is present in a telephone line 18. If it is, and if the time gaps in it are not too large, the talking connection just established with the line is to be maintained so long as speech continues. If normal speech is not present, then after a span of about 12 seconds, this talking connection is broken so as to prepare system 10 for responding to the next incoming call.

Among the various kinds of nonspeech conditions that might exist in line 18, which conditions ought to result in breaking of a talking connection with the line, are: (1) complete silence for the time span just mentioned; (2) a continuous nongapped signal which lasts for the same time span; and (3) an interrupted signal, such as that for example which is typically used to indicate an "off-hook" condition. In circuit 12, silence or a continuous signal lasting for about 12 seconds will result (as will be explained) in breaking of a talking connection with line 18. An interrupted signal having successive time gaps each less than about 166.5 milliseconds will also result in breaking of such a connection. Normal speech, however, will result in maintenance of a talking connection.

Let us, then, consider how circuit 12 performs with each of the above four conditions respectively existing in line 18. After starting up of counter 56 (following the end of the announcement), if complete silence exists in the line, transistors 36, 38 remain off and on, respectively. Counter 56 counts up to a count of EIGHT, whereupon the supply of pulses through gate 62 is shut off. Counter 58, however, continues counting. On this counter reaching a count of EIGHT, a "1" state is applied to its D output terminal, and hence also to conductor 26. Conductor 26 applies this "1" state to a conventional audio tone generator in block 16, which then feeds a tone to line 18. This tone serves as a warning to the calling party (if he is listening) that unless he starts transmitting a message, the talking connection established between system 10 and line 18 will shortly be broken.

Assuming that silence still remains in the telephone line, counter 58 continues counting, and on reaching a count of TWELVE, places "1" states on both its C and D output terminals. When this occurs, the output of gate 86 switches to a "0" state which is applied to conductor 28. And, with application of a "0" state to conductor 28, this is transmitted to conventional apparatus in block 16 which effects breaking of the talking connection previously established with line 18. On breaking of this talking connection, the connection between line 18 and conductor 22 is broken, and the apparatus in block 16 is placed in a condition ready to respond to the next incoming call. Further, conditions in circuit 12 return to the initial conditions described above.

In the case of a continuous nongapped signal in line 18 after the end of the announcement, transistor 36 turns on and transistor 38 turns off. A "1" state is thus applied to the input of inverter 68, with the output of this inverter then applying a "0" state to the upper input of gate 60. As a consequence, the output of gate 60 is held in a "1" state so long as the continuous signal in the telephone line lasts. Thus, counter 56 is held in a zero-count condition. Counter 58, however, resumes counting, and on reaching the counts of EIGHT and TWELVE, produces the same actions just described above in the case of a "silence" condition.

In the event of an interrupted signal occuring in line 18 after the end of the announcement, transistors 36, 38 alternate between on and off conditions in response to the signal. With this signal having successive time gaps less than about 166.5 milliseconds, each time that a time gap occurs, transistors 36, 38 switch to nonconducting and conducting states, respectively. This results in a "1" state being applied to the upper input of gate 60 which, with the lower input of this gate then also being in a "1" state, results in the output being placed in a "0" state to allow counting to occur in counter 56.

Inasmuch as the time gaps mentioned in the signal in line 18 are less than 166.5 milliseconds, transistors 36, 38 switch to conducting and nonconducting states, respectively, before the count in counter 56 can reach a count of FIVE. In other words, a "1" state will reappear at the output of gate 60, and hence at the reset terminal of the counter, prior to 166.5 milliseconds from the time that the counter began counting pulses. With clock 72 having the frequency indicated earlier, it takes about 166.5 milliseconds for a count of FIVE to be stored in counter 56, at which time its A and C output terminals would simultaneously be placed in "1" states. Thus, the output of gate 64 remains in a "1" state which is applied to the upper input of gate 66.

Since, during the receipt of such an interrupted signal over line 18, a "1" state is maintained at both the upper and lower inputs of gate 66, counter 58 continues counting after the end of the announcement to produce the same results described earlier. Circuit 12 thus determines that although the signal coming in over the telephone line indeed contains gaps, these gaps are too short to characterize normal speech. The circuit therefore produces an output signal which effects breaking off the talking connection with the line.

Considering now the circumstance where normal speech occurs in the telephone line following the announcement, such speech will be characterized by recurring time gaps exceeding about 166.5 milliseconds. As a consequence, transistors 36, 38 switch alternately on and off at a rate which allows counter 56 rather frequently to reach a count of FIVE before it is reset to a zero-count condition. And, each time that counter 56 reaches a count of FIVE, with its A and C output terminals then simultaneously placed in "1" states, a "0" state occurs at the output of gate 64 which is applied to the upper input of gate 66. Each time that such a "0" state occurs, the output of gate 66 is placed in a "1" state to reset counter 58 to a zero-count condition. In particular, resetting of counter 58 to a zero-count condition occurs at sufficiently frequent intervals to prevent this counter from reaching a count of EIGHT or TWELVE.

Thus, during normal speech, circuit 12 assures that the talking connection with line 18 remains intact. When normal speech stops, of course, and silence exists for about 12 seconds, the operation previously described occurs which results in breaking of the talking connection.

5. Conclusion

Apparatus is thus provided by the invention which, through analyzing the time gap characteristics of a signal, assures reliable monitoring of the presence and continuity of normal speech in a telephone line and the like. Other conditions which may from time to time exist in such a line result in the production of an output signal which may be used, as described herein, to break a talking connection with such a line.

The use of digital circuitry in the criterion-determining circuit results in a construction wherein extremely accurate timing is attained, which timing assures a very high degree of reliability in detecting the presence and continuity of a speech signal.

While a preferred embodiment of the invention has been described herein, it is appreciated that variations and modifications may be made without departing from the spirit of the invention.

It is claimed and desired to secure by letters patent:

1. A voice-signal-monitoring control apparatus usable in combination with a telephone line and the like for detecting the presence and continuity of a voice signal in such a line, where such a signal is characterized throughout its duration by a chain of successive, alternating talking and nontalking intervals, with both kinds of such intervals no longer than one time span, and with the nontalking intervals no less than another time span which is shorter than said one time span, said apparatus comprising an input circuit adapted to be operatively coupled to such a line to receive signals carried therein, a digital criterion-determining circuit operatively connected to said input circuit, cooperating therewith to follow, continuously, signal conditions in the line so as to identify and note the continuity of a signal having the interval characteristics described above, said criterion-determining circuit including clock pulse means, and pulse counting means operatively connected to said clock pulse means, said pulse counting means including one portion which reaches a certain count condition in the absence of a voice signal, and another portion which, in the presence of such a signal, inhibits said one portion from reaching said certain count condition, and an output circuit operatively connected to said pulse counting means and placeable by the latter in two different output conditions, one of which indicates the presence of a voice signal as above described in the line, and the other of which indicates the absence of such a signal, the output circuit being placed and held in its said one output condition under all circumstances in the absence of said one portion of said pulse counting means having reached its said certain count condition, and on the latter event occurring being placed in its said other output condition.

2. The apparatus of claim 1, wherein said one and other portions of said pulse counting means each comprises a digital pulse counter which counts in the portion, and said clock pulse means comprises a pair of clock pulse generators, each operatively connected to a different one of said counters to supply countable pulses thereto.

3. The apparatus of claim 2, which further includes electronic gating means operatively interconnecting said counters whereby a predetermined count condition reached in the counter in said other portion of said pulse counting means is effective to prevent the counter in said one portion of said pulse counting means from reaching its said certain count condition.

4. The apparatus of claim 3, wherein said counter in said other portion of said pulse counting means, and the clock pulse generator supplying pulses thereto are so constructed that said predetermined count condition is reached in a time exactly equaling said other time span.

5. Voice-signal-monitoring control apparatus usable in combination with a telephone line and the like for detecting the presence and continuity of a voice signal in such a line, where such a signal is characterized throughout its duration by a chain of successive alternating talking and nontalking intervals, with both kinds of such intervals no longer than one time span, and with the nontalking intervals no less than another time span which is shorter than said one time span, said apparatus comprising an input circuit adapted to be operatively coupled to such a line to receive signals carried therein, a first resettable digital pulse counter and a first clock pulse generator connected to supply countable pulses thereto, means operatively interconnectingg said input circuit and said first counter whereby with a signal present in the line said first counter is held reset, and with no signal present in the line the first counter is enabled to count pulses, said first counter, if enabled to count pulses throughout an interval at least equaling said other time span, reaching a predetermined count condition, a second resettable digital pulse counter and a second clock pulse generator connected to supply countable pulses thereto, said second counter, if enabled to count pulses throughout an interval at least equaling said one time span, reaching a certain count condition, means operatively interconnecting said first and second counters whereby reaching of said predetermined count condition by said first counter is effective to reset said second counter, and an output circuit operatively connected to said second counter and placeable thereby in two different output conditions, said output circuit being placed in one of its said output conditions under all circumstances in the absence of said second counter having reached its said certain count condition, and being placed in its other output condition on the second counter reaching said certain count condition.

6. Voice-signal-monitoring control apparatus usable in combination with a telephone line and the like for detecting the presence and continuity of a voice signal in such a line, where such a signal is characterized throughout its duration by a chain of successive alternating talking and nontalking intervals, with both kinds of such intervals no longer than one time span, and with the nontalking intervals no less than another time span which is shorter than said one time span, said apparatus comprising a first resettable digital timing means for producing an output signal on having continuously timed for a first certain time interval equaling said one time span, a second resettable digital timing means for producing a control signal on having continuously timed for a second certain time interval equaling said other time span, first coupling means coupling said first and second timing means whereby a control signal produced by the latter is effective to reset the former, and second coupling means for coupling said second timing means to a telephone line for the communication to the former of signals in the latter, whereby during each interval that a signal exists in the line the second timing means is held reset, and during each interval that a signal is absent from the line the second timing means is enabled to time.

* * * * *